United States Patent
Van Nederkassel et al.

(10) Patent No.: US 12,330,114 B2
(45) Date of Patent: Jun. 17, 2025

(54) COMPRESSOR INSTALLATION AND METHOD FOR SUPPLYING COMPRESSED GAS

(71) Applicant: ATLAS COPCO AIRPOWER, NAAMLOZE VENNOOTSCHAP, Wilrijk (BE)

(72) Inventors: Frederik Van Nederkassel, Wilrijk (BE); Stijn Johan E. Broucke, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 648 days.

(21) Appl. No.: 17/430,744

(22) PCT Filed: Jan. 21, 2020

(86) PCT No.: PCT/IB2020/050431
§ 371 (c)(1),
(2) Date: Aug. 13, 2021

(87) PCT Pub. No.: WO2020/183251
PCT Pub. Date: Sep. 17, 2020

(65) Prior Publication Data
US 2022/0143550 A1    May 12, 2022

(30) Foreign Application Priority Data
Mar. 12, 2019 (BE) .................. 2019/5151

(51) Int. Cl.
*B01D 53/26* (2006.01)
*B01D 53/04* (2006.01)
*B01D 53/06* (2006.01)

(52) U.S. Cl.
CPC ....... *B01D 53/261* (2013.01); *B01D 53/0438* (2013.01); *B01D 53/0446* (2013.01);
(Continued)

(58) Field of Classification Search
None
See application file for complete search history.

(56) References Cited

U.S. PATENT DOCUMENTS 5,309,725 A    5/1994  Cayce
5,925,169 A *  7/1999  Vertriest ............... B01D 53/261
                                                      95/126
(Continued)

FOREIGN PATENT DOCUMENTS

CN    203857622 U   10/2014
CN    107970748 A    5/2018
(Continued)

OTHER PUBLICATIONS

International Search Report and Written Opinion in corresponding PCT Application No. PCT/IB2020/050431, dated May 8, 2020.
(Continued)

*Primary Examiner* — Jason M Greene
(74) *Attorney, Agent, or Firm* — BACON&THOMAS, PLLC

(57) ABSTRACT

Compressor installation includes a compressor device, a compressor element, a compressed gas outlet, a compressed gas outlet pipe connected to the compressor device, and a dryer connecting to the outlet pipe with a desiccant for drying the compressed gas coming from the compressor device. The dryer includes a drying section and a regeneration section with an entry and an exit for a regeneration gas. A regeneration pipe is connected to the entry of the regeneration section. In the regeneration pipe, a first heat exchanger is provided for heating the regeneration gas. The
(Continued)

compressor installation includes a heat pipe with a first end which is in contact with a hotspot at a location in the compressor device where the temperature is higher than the temperature at the outlet of the compressor element and with a second end which is in contact with a secondary section of the first heat exchanger.

20 Claims, 4 Drawing Sheets

(52) U.S. Cl.
CPC .......... *B01D 53/06* (2013.01); *B01D 2257/80* (2013.01); *B01D 2259/4009* (2013.01)

(56) References Cited

U.S. PATENT DOCUMENTS

| | | | | |
|---|---|---|---|---|
| 2012/0222549 | A1* | 9/2012 | Vermeer | B01D 53/261 95/41 |
| 2018/0154302 | A1* | 6/2018 | Vertriest | B01D 53/06 |
| 2020/0164301 | A1 | 5/2020 | Vertriest et al. | |

FOREIGN PATENT DOCUMENTS

| | | | | |
|---|---|---|---|---|
| JP | H10-028832 | A | 2/1998 | |
| JP | H1028832 | A | 2/1998 | |
| JP | 201869235 | A | 5/2018 | |
| JP | 2018-145965 | A | 9/2018 | |
| KR | 10-2018-0045821 | A | 5/2018 | |
| WO | 2011017782 | A1 | 2/2011 | |
| WO | 2016094968 | A1 | 6/2016 | |
| WO | WO 2018162960 | A1 * | 9/2018 | .............. F04B 35/04 |
| WO | 2018229593 | A1 | 12/2018 | |

OTHER PUBLICATIONS

Belgium Search Report in corresponding Belgium Application No. 201905151, dated Jun. 4, 2019.

JP Office Action in corresponding JP Application No. 2021-551789, dated Oct. 23, 2023.

Coomunication of Third Party Observations cited in corresponding EP Appln. No. 20709316.2, dated Mar. 6, 2024.

European Search Report in corresponding European Appln. No. EP24175439.9, dated May 25, 2024.

* cited by examiner

COMPRESSOR INSTALLATION AND METHOD FOR SUPPLYING COMPRESSED GAS

The present invention relates to a compressor installation.

BACKGROUND OF THE INVENTION

Compressor installations are already known which are provided with a compressor device, a compressed gas outlet pipe and a dryer connecting to said outlet pipe, which dryer is of the type which uses a desiccant to dry the compressed gas coming from the compressor device, whereby the dryer is provided with a drying section and a regeneration section.

The drying section is provided with a desiccant for drying the compressed gas which is guided through it and is provided with an entry which connects to said outlet pipe of the compressor device, and an exit which also serves as the compressor installation outlet for supplying compressed and dried gas to a downstream network to which compressed gas consumers can be connected.

When the compressed gas to be dried flows through the desiccant in the drying section, moisture from the compressed gas is taken up into the desiccant by adsorption or absorption.

In the regeneration section, as is known, desiccant is regenerated which has already been used for drying compressed gas and which is saturated or partially saturated with moisture extracted from the gas to be dried.

The desiccant in the regeneration section is, hereby regenerated by means of a regeneration gas which is guided through it via an entry and an exit of said regeneration section.

For liquid-free compressor devices a so-called "heat of compression" dryer (HOC-dryer) can be used, whereby the regeneration gas is directly tapped off from said compressor device outlet pipe, for example at the compressor device outlet.

The tapped off regeneration gas has a sufficiently high temperature to be able to take up moisture from the desiccant to be regenerated.

A disadvantage of such known device is that the regeneration gas has a high absolute humidity and that after regeneration the desiccant still contains a certain amount of moisture, such that when it is used at a later stage to dry gas, it has a more limited capacity to take up moisture and therefore needs to be regenerated again sooner.

In addition, liquid-injected compressor devices do not lend themselves to the use of compression heat for regeneration, because the temperature at the compressor device outlet will typically be much lower here, such that the compressed gas would not be able to dry the desiccant to be regenerated, or not sufficiently.

Another disadvantage in liquid-injected compressor devices is that the compressed gas at the compressor device outlet contains a certain amount of liquid which can contaminate the desiccant.

A solution to avoid the contamination of the desiccant is to guide the entire flow of compressed gas coming from the compressor device to the drying section, after the compressed gas is first cooled and guided through a liquid separator.

Subsequently, regeneration gas can be tapped off at the drying section outlet, said regeneration gas being heated by means of a heat exchanger, for example using the heat of the compressed gas at the compressor device outlet or by using the heat of the injected liquid.

A problem that occurs in such approach is the fact that, for the operation of the compressor device and the lifetime of the liquid, the temperature of the liquid at the compressor device outlet must be kept as low as possible, preferably under 80° C., whereas, to be able to properly regenerate the desiccant, the temperature of the regeneration gas is preferably higher than 100° C. and even more preferably higher than 120° C.

SUMMARY OF THE INVENTION

The purpose of the present invention is to provide a solution to one or more of the aforementioned and/or other disadvantages.

To this end the present invention relates to a compressor installation which is provided with a compressor device with at least one compressor element with a compressed gas outlet, a compressed gas outlet pipe connected to said compressor device, and a dryer connecting to said outlet pipe of the type which uses a desiccant for drying the compressed gas coming from the compressor device, whereby the dryer is provided with a drying section and a regeneration section with an entry and an exit for a regeneration gas, whereby a regeneration pipe is connected to the entry of the regeneration section, and whereby in said regeneration pipe a first heat exchanger is provided with a primary section through which the regeneration gas can be guided for heating the regeneration gas, characterised in that the compressor installation is further provided with a heat pipe with a first end which is in heat-transferring contact with a heat source in the form of a hotspot at a location in the compressor device where the temperature is higher than the temperature at the outlet of the compressor element and with a second end which is in heat-transferring contact with a secondary section of said first heat exchanger.

This provides the advantage that by using the so-called hotspot in the compressor device, there will be sufficient heat to sufficiently heat the regeneration gas such that the regeneration of the desiccant will be better than in the known devices. Typically, the temperature in such hotspot amounts to 120° C. to 170° C.

Another advantage is that by means of the heat pipe, the heat is removed from the hotspots, which will contribute to increasing the compressor device's lifetime and efficiency.

Said hotspot is for example located in a drive of the compressor device, for example in the electric coils of an electric motor which is configured to drive said at least one compressor element. Such hotspots may also be present in or near any bearings of the compressor device.

The operation of a compressor installation according to the invention is similar to the known compressor installations provided with a dryer in which, for drying compressed gas, said compressed gas is guided through a drying section of the dryer.

Said dryer can be executed in different ways and can for example consist of one housing in which both the drying section and the regeneration section are located or can comprise two or more vessels, at least one of which forms a drying section and at least one the regeneration section.

The invention also relates to a method for supplying compressed gas coming from a compressor device with at least one compressor element with a compressed gas outlet, whereby the compressed gas is guided through a desiccant in a drying section for drying said compressed gas and whereby the desiccant is subsequently regenerated in a regeneration section by means of a regeneration gas which is guided through said regeneration section, characterised in that the method comprises the step of heating the regeneration gas before it is guided through said regeneration section, using the heat coming from a hotspot in said compressor device where the temperature is higher than the temperature at said outlet of said compressor element.

Preferably, a heat pipe is used to transport the heat from the hotspot to the regeneration gas.

An advantage of such method is that a sufficiently high temperature can be reached for the regeneration gas, such that all or practically all the moisture can be desorbed or extracted from the desiccant in the regeneration section.

Another advantage is that the heat is removed from the hotspots which will contribute to increasing the compressor device's lifetime and efficiency.

BRIEF DESCRIPTION OF THE DRAWINGS

With the intention of better showing the characteristics of the invention, a few preferred variants of a compressor installation according to the invention as well as a method according to the invention, for supplying compressed gas are described hereinafter by way of an example without any limiting nature, with reference to the accompanying drawings, wherein.

DETAILED DESCRIPTION OF THE INVENTION

Figure 1:
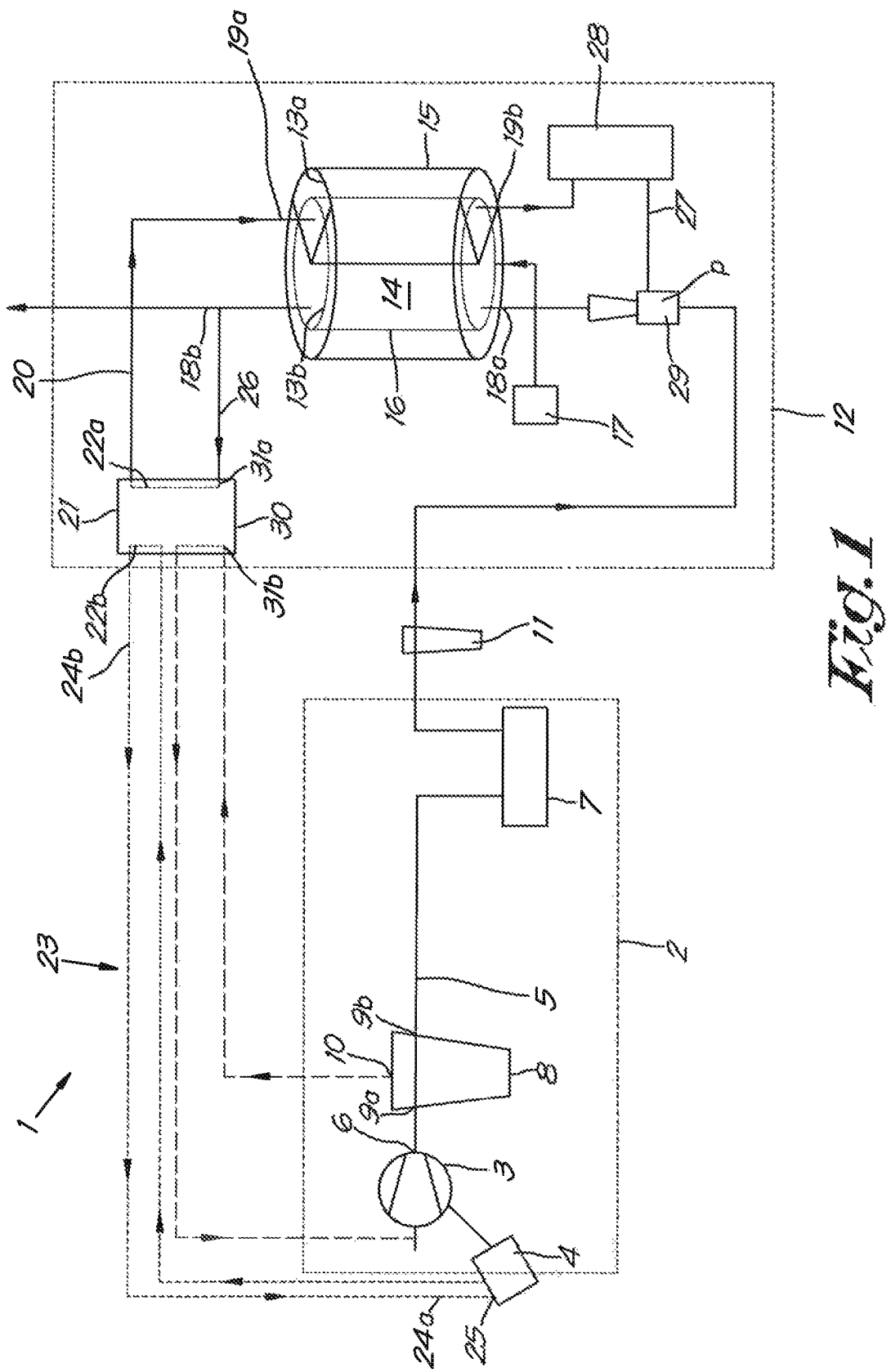
FIG. 1 schematically shows a compressor installation according to the invention.

The compressor installation 1 according to the invention schematically shown in FIG. 1 comprises a compressor device 2 with in this case one compressor element 3 which is driven by a drive 4.

The drive 4 is for example an electric motor, but can also be another type of drive such as a thermal motor, a turbine wheel or the like.

It is not excluded that the compressor device 2 comprises more than one compressor element 3 and/or more than one drive 4.

In this case, but not necessarily, the compressor device 2 comprises an outlet pipe 5 which is connected to the outlet 6 of the compressor element 3.

An aftercooler 7 is included in said outlet pipe 5 for cooling the compressed air, however this is not necessary for the invention, Downstream from said aftercooler 7, a liquid separator can possibly be included in the outlet pipe 5.

As shown in FIG. 1, the compressor device 2 is an oil-injected compressor device 2, whereby oil is injected in the compressor element 3. According to the invention this is not strictly necessary, as the invention can also be applied with an oil-free compressor device.

In said outlet pipe 5, upstream from said aftercooler 7, an oil separator 8 is included with a compressed gas inlet 9a and outlet 9b and an outlet 10 for separated oil.

Downstream from the aftercooler 7, a filter 11 is also included in the outlet pipe.

The device 1 further comprises a dryer 12, which is provided with a so-called regeneration section 13a and a drying section 13b.

Both in the regeneration section 13a and in the drying section 13b a desiccant 14 has been added.

In the example shown, the dryer 12 is provided with a housing 15 within which the drying section. 13b and the regeneration section 13a are located.

A drum 16 containing the desiccant 14 is mounted in the housing, said drum 16 being connected to driving means 17 such that the desiccant 14 can be moved successively through the drying section 13b and the regeneration section 13a.

The desiccant 14 in the drying section 13b will be used for drying the compressed gas which is guided through it and to this end the drying section 13b is in this case provided with an entry 18a which connects to said outlet pipe 5 of the compressor device 2, and with an exit. 18b which serves as an outlet for supplying compressed and dried gas.

In this case the entire flow of compressed gas coming from said compressor element 3 is guided to the entry 18a of the drying section 13b.

According to the invention the regeneration section 13a is provided with an entry 19a and an exit 19h and a regeneration pipe 20 connected to the entry 19a to guide the regeneration gas through the regeneration section 13a to be able to regenerate moist desiccant 14 located in the regeneration section 13a.

A first heat exchanger 21 is provided in said regeneration pipe 20 for heating the regeneration gas with a primary section 22a through which the regeneration gas is guided, whereby the device 1 is further provided with a heat pipe 23 with a first end 24a which is in heat-transferring contact with a heat source in the form of a hotspot 25 at a location in the compressor device 2 where the temperature is higher than the temperature at the outlet 6 of the compressor element 3 and with a second end 24b which is in heat-transferring contact with the secondary section 22b of the first heat exchanger 21.

The heat pipe 23 is only schematically shown here.

Said hotspot 25 can be located in the drive 4, typically in the electric coils of the electric motor or in a bearing of the compressor device 2. The temperature at the hotspot 25 will amount to approximately 120° C. to 170° C.

In the example shown, the regeneration pipe 20 is connected to the exit 18b of the drying section 13b via a tap off pipe 26 for tapping off regeneration gas at the exit 18b of the drying section 13b. In other words, part of the dried compressed gas is used as regeneration gas.

In this case the exit 19b of the regeneration section 13a is connected via a return pipe 27 to the outlet pipe 5 of the compressor device 2 at a point P near the entry 18a of the drying section 13b.

A cooler 28 is included in said return pipe 27 for cooling the regeneration gas after regenerating. It is not excluded that another liquid separator is included after the cooler 28 in the return pipe 27 for separating condensed liquid.

In this case the outlet pipe 5 is also connected with the return pipe 27 via a venturi 29.

Instead of a venturi ejector, a so-called blower or booster could also be used for the recombination of the used regeneration gas with gas to be dried.

In addition to said first heat exchanger 21, the device 1 in this case is also provided with a second heat exchanger 30 with a primary section 31a that is included in the regeneration pipe 20 and a secondary section 31b that is connected to the outlet 10 for separated oil of the oil separator 8.

The second heat exchanger 30, seen in the flow direction of the regeneration gas, is installed upstream from the first heat exchanger 21.

Indeed, the temperature of the separated oil is lower than the temperature of the hotspot 25. After heating with the second heat exchanger 30, the regeneration gas will be further heated to a higher temperature using the first heat exchanger 21.

In this case the primary sections 22a and 31a of the first and second heat exchanger 21 and 30 are combined to form a whole.

The operation of the device 1 is very simple and as follows.

The compressor element 3 will compress gas, for example air, in the known way.

During the operation, oil will be injected in the compressor element 3 for the lubrication, cooling and sealing thereof.

Typically, the temperature of the gas and the oil at the outlet 6 of the compressor element 3 will be around 80° C.

The compressed gas will pass via the outlet pipe 5 along the oil separator 8 for separating the injected oil from the compressed gas.

The gas subsequently passes through the aftercooler 7, whereby the compressed gas will cool to approximately 30° C. and through the filter 11 for filtering out any last impurities.

The outlet pipe 5 will guide all the cooled and purified compressed gas to the entry 18a of the drying section 13b of the dryer 12.

As the gas passes through the drying section 13b, the desiccant 14 will take up moisture from the gas. In other words, the desiccant 14 will become moist.

When the gas that is now dry leaves the drying section 13b, it will for example be transported to a network of consumers of compressed gas.

A part of said dry gas will be guided to the regeneration pipe 20 via the tap off pipe 26.

This so-called regeneration gas will hereby pass via the second and then the first heat exchanger 30, 21 to heat the regeneration gas.

Via the second heat exchanger 30, the regeneration gas will be heated using the separated oil.

Via the first heat exchanger 21, the regeneration gas will be heated using the heat pipe 23. The heat pipe 23 will hereby extract heat at the hotspot 25 in the drive 4.

The two aforementioned heat exchangers 21, 30 will heat the regeneration gas from approximately 30° C. to approximately 120° C.

Via the regeneration pipe 20, the gas is guided to the inlet 19a of the regeneration zone 13a where it flows through the moist desiccant 14 in the regeneration zone 13a.

The regeneration gas will regenerate the desiccant 14, this means: extract moisture from the moist desiccant 14 or in other words dry the desiccant 14 itself.

Subsequently, the dried desiccant 14 will be moved to the drying section 13b by means of the driving means 17 of the drum 16, while moist desiccant 14 ends up in the regeneration section 13a at the same time.

The regeneration gas which after passage through the regeneration section 13a contains moisture and has a temperature of approximately 75° C., will be transported via the return pipe 27 to the entry 18a of the drying section 13b and thus dried. It will hereby pass via the cooler 28 and be cooled to approximately 30° C. before it is recombined via the venturi 29 with the compressed gas coming from the compressor device 2.

In the example described above and shown in the figures, heat is extracted from the oil via the second heat exchanger 30 and transferred to the regeneration gas.

It is also possible that, additionally or alternatively to said second heat exchanger 30, said aftercooler 7 in the outlet pipe 5 forms the secondary section of a third heat exchanger, the primary section of which is included in the regeneration pipe 20.

The heat of the compressed gas can thus be used for heating the regeneration gas.

Analogue to said primary section of the first and second heat exchanger, the primary sections of the first and third heat exchanger can be combined to form a whole.

Figure 2:
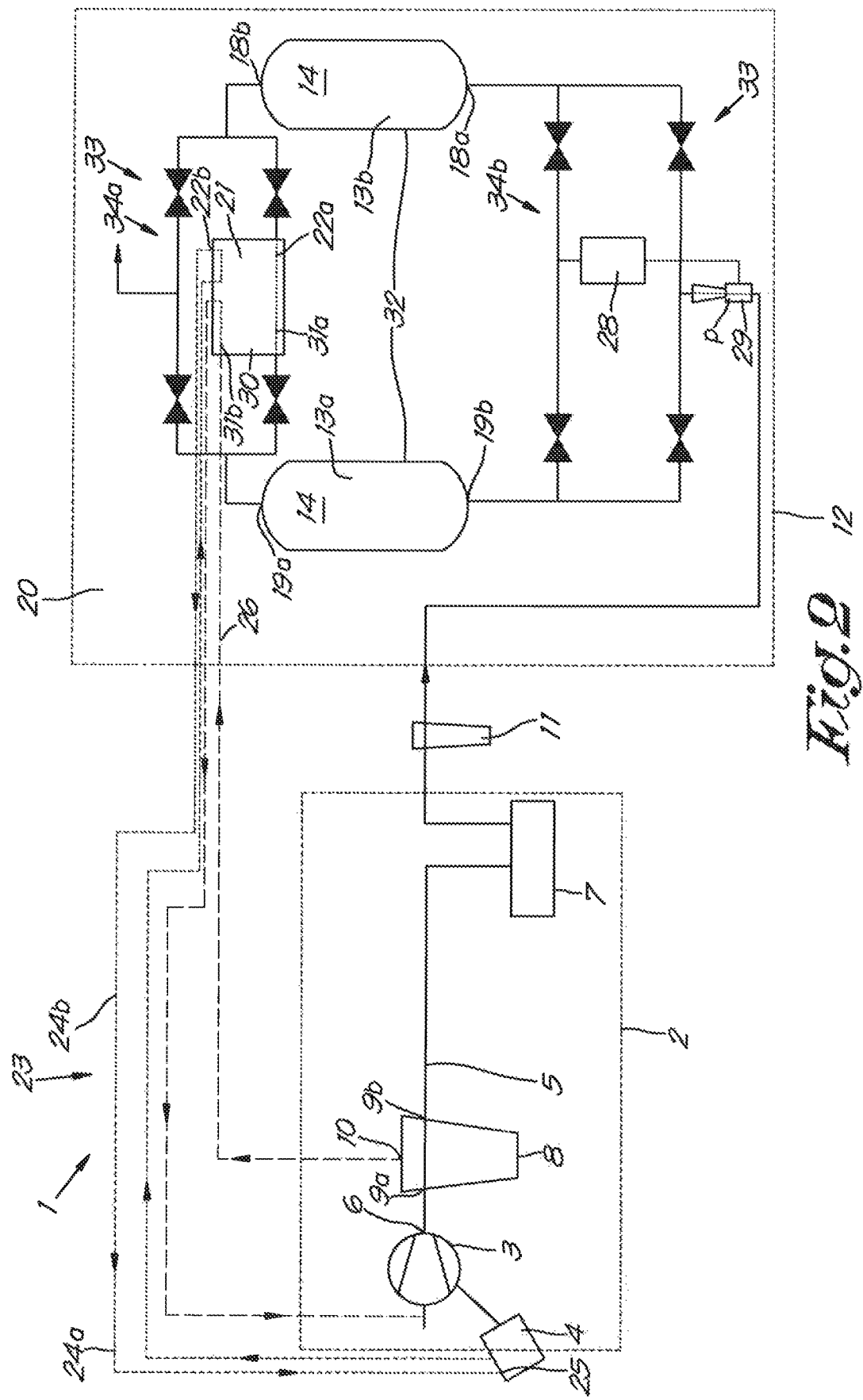
FIG. 2 shows an alternative embodiment of FIG. 1.

FIG. 2 shows a variant according to FIG. 1, whereby in this case the dryer 12 is made differently.

Instead of a rotating or revolving drum 16, the dryer 12 now comprises a number of vessels 32 that are filled with the desiccant 14.

In the example shown there are two vessels 32, but it can also be three, four or more vessels, at least one vessel of which forms the drying section 13b and at least one vessel forms the regeneration section 13a.

In addition to said vessels 32, the dryer further comprises a valve system 33 which connects the outlet pipe 5, the regeneration pipe 20 and in this case also the return pipe 27 and the tap off pipe 26 to said vessels 32.

Said valve system 33 comprises two separate blocks 34a, 34b.

Said valve system 33 is a system of various pines and valves that can be adjusted such that at least one vessel 32 is always regenerated, while the other vessels 32 dry the compressed gas, whereby in this case by adjusting the valve system 33 the vessels 32 are successively regenerated in turn.

The cooler 28, the venturi 29, and at least a section of the return pipe 27 and the tap off pipe 26 are integrated in the valve system 33, but this is not necessary for the invention.

For the rest the operation is analogue to the operation of the device 1 in FIG. 1 described above.

Figure 3:
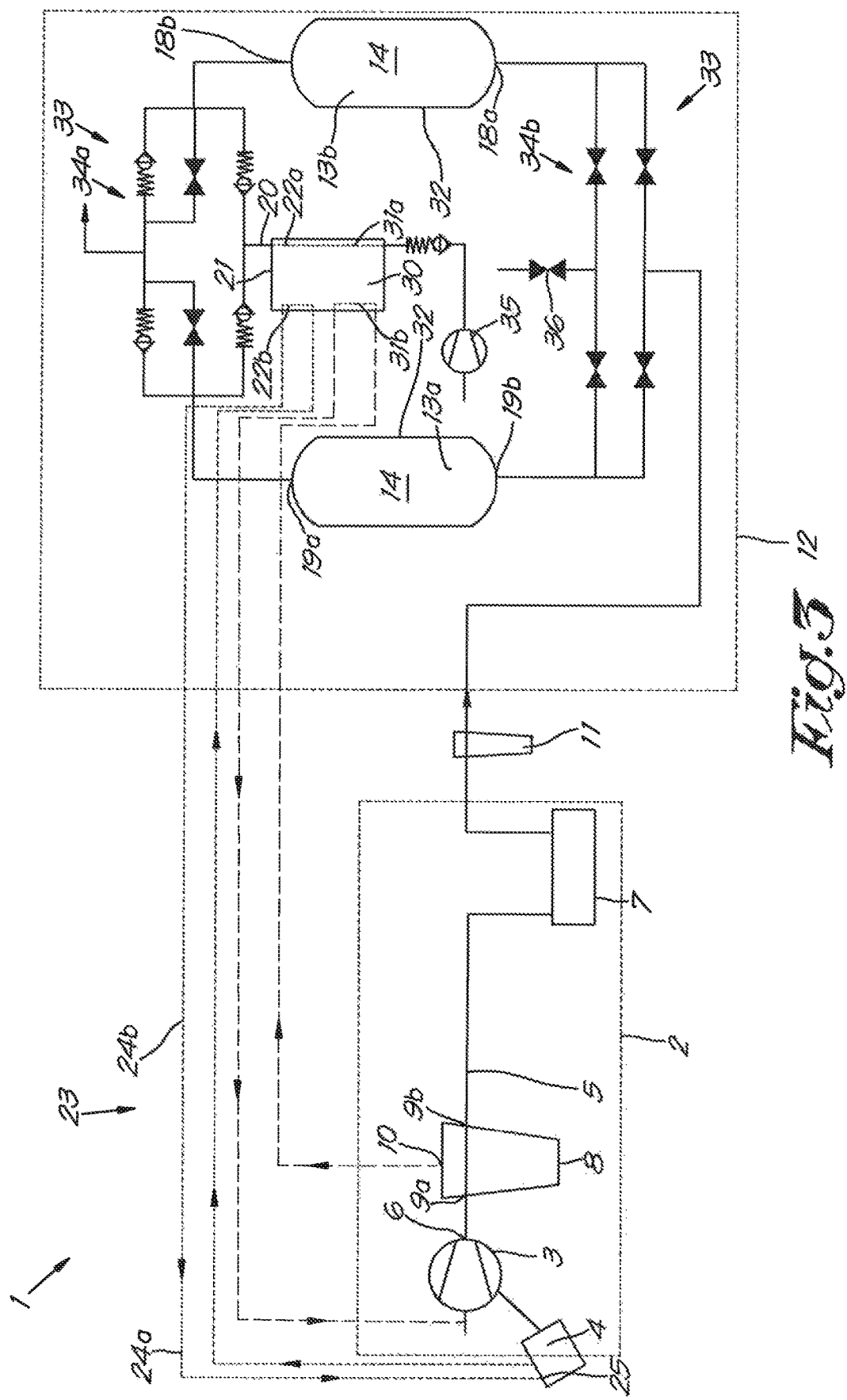
FIGS. 3 and 4 show variants of FIG. 2.

FIG. 3 shows a variant of FIG. 2, whereby in this case the regeneration gas is not tapped off from the dried, compressed gas, but comes from an external source 35.

The regeneration gas is no longer brought to the inlet 18a of the drying section 13b via a return pipe 27 either, but after regeneration of the desiccant will be removed or blown off, for example by means of a blow-off valve 36.

Figure 4:
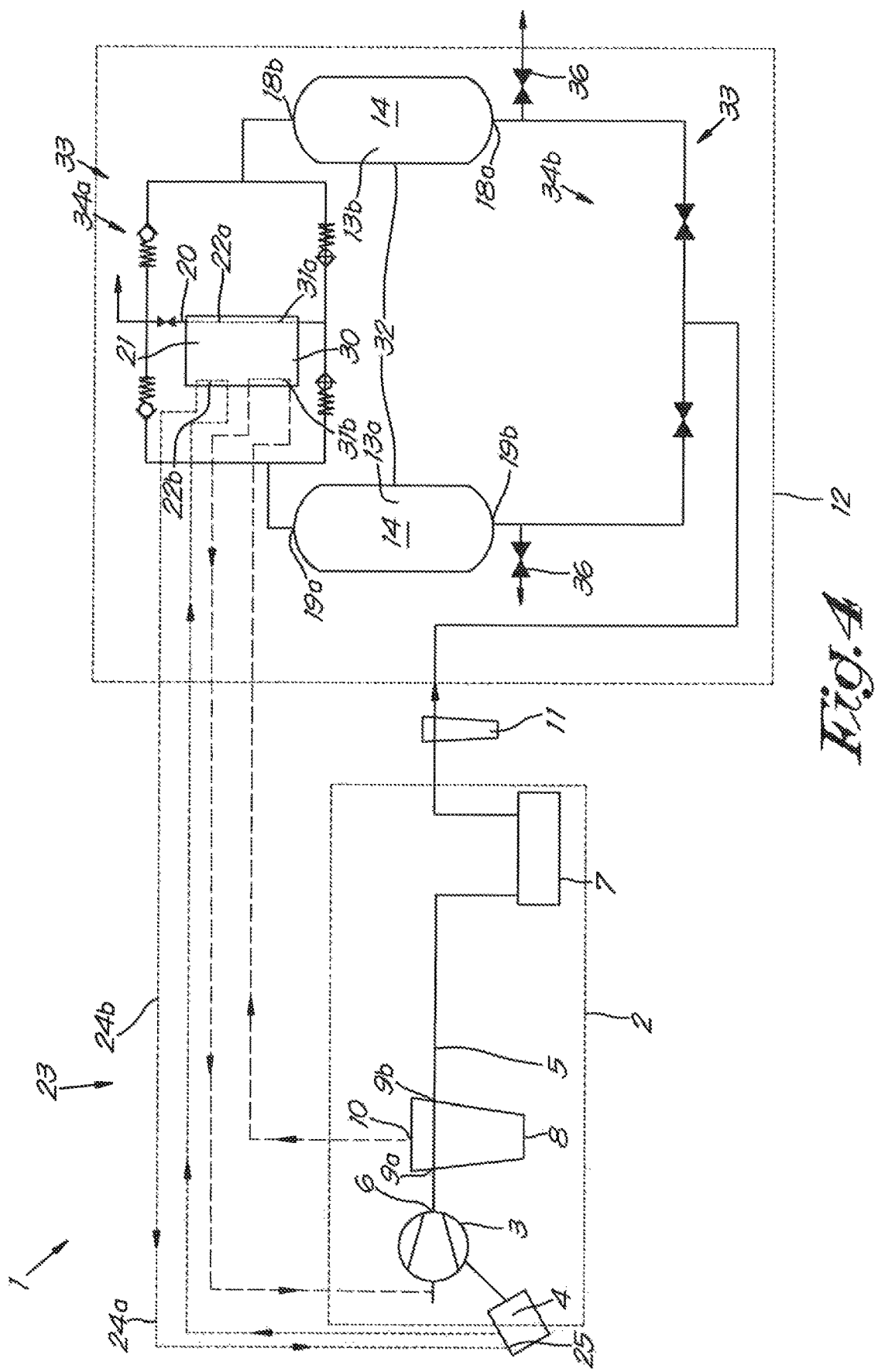

FIG. 4 shows another embodiment, whereby in this case the regeneration gas is tapped off again at the outlet 18b of the drying section 13b, as shown in FIG. 2, but whereby the regeneration gas after regeneration is blown off, for example by means of a blow-off valve 36, as shown in FIG. 3.

For the rest the embodiments of FIG. 3 and are identical to FIG. 2.

Although in all previously shown and described embodiments, there was always only one heat pipe 23, it is not excluded that the device 1 is provided with several heat pipes 23 which with their second end 24b are in heat-transferring contact with the secondary section 22b of said first heat exchanger 21. Furthermore, these multiple heat pipes 23 can be in heat-transferring contact with their first end 24a with various heat sources in the form of hotspots 25 at various locations in the compressor device 2.

It may be clear that the specific execution of the valve system 33 in FIGS. 2 to 4 is not restrictive for the invention and that it can be realised in many different ways.

The present invention is by no means limited to the embodiments described as an example and shown in the drawings, but a compressor installation according to the invention as well as a method according to the invention for supplying compressed gas can be realised in ail kinds of forms and dimensions, without departing from the scope of the invention.

The invention claimed is:

1. A compressor installation comprising a compressor device with at least one compressor element with a compressed gas outlet, a compressed gas outlet pipe connected to said compressor device, and a dryer connecting to said outlet pipe of the type which uses a desiccant for drying the compressed gas coming from the compressor device, wherein the dryer is provided with a drying section and a regeneration section with an entry and an exit for a regeneration gas, wherein a regeneration pipe is connected to the entry of the regeneration section, wherein in said regeneration pipe a first heat exchanger is provided for heating the regeneration gas, wherein the first heat exchanger includes a primary section connected to the regeneration pipe, wherein the compressor installation is further provided with a heat pipe for supplying heat to the secondary section of the heat exchanger, and wherein said heat pipe is included in a heat-transfer circuit that is separate from and unconnected to the compressed gas outlet and compressed gas outlet pipe, said heat pipe having:

a first end which is in heat-transferring contact with a heat source in the form of a hotspot at a location in the compressor device where the temperature is higher than the temperature at outlet of the compressor element, and a second end which is in heat-transferring contact with the secondary section of said first heat exchanger.

2. The compressor installation according to claim 1, wherein the hotspot is located in a drive of the compressor device.

3. The compressor installation according to claim 1, wherein the hotspot is located in a bearing of the compressor device.

4. The compressor installation according to claim 1, wherein the compressor installation is configured such that the entire flow of compressed gas coming from said compressor element is transported to an entry of said drying section.

5. The compressor installation according to claim 1, wherein a tap off pipe is provided at an exit of the drying section which connects to said regeneration pipe for tapping off regeneration gas at the exit of the drying section.

6. The compressor installation according to claim 1, wherein the exit of the regeneration section is connected via a return pipe to the outlet pipe of the compressor device at a point near the entry of the drying section.

7. The compressor installation according to claim 6, wherein in said return pipe a cooler is included.

8. The compressor installation according to claim 6, wherein the return pipe is connected to the outlet pipe via a venturi.

9. The compressor installation according to claim 1, wherein the compressor device is an oil-injected compressor device, whereby oil is injected in the compressor element.

10. The compressor installation according to claim 9, wherein an oil separator is included in said outlet pipe, comprising a compressed gas inlet and outlet and an outlet for a separated oil.

11. The compressor installation according to claim 10, wherein the outlet for the separated oil is connected to a secondary section of a second heat exchanger for guiding the separated oil to the secondary section of the second heat exchanger.

12. The compressor installation according to claim 11, wherein a primary section of the second heat exchanger is included in the regeneration pipe.

13. The compressor installation according to claim 12, wherein a primary section of said first heat exchanger and the primary section of the second heat exchanger are combined to form a whole.

14. The compressor installation according to claim 1, wherein the dryer is provided with a housing within which the drying section and the regeneration section are located, wherein in the housing a drum is mounted containing the desiccant, said drum being connected with driving means such that the desiccant can successively move through the drying section and the regeneration section.

15. The compressor installation according to claim 1, wherein the dryer comprises a number of vessels containing the desiccant, at least one vessel of which forms the drying section and at least one vessel forms the regeneration section.

16. The compressor installation according to claim 15, wherein the dryer further comprises a valve system which connects the outlet pipe, the regeneration pipe and possibly the return pipe and the tap off pipe to said vessels, wherein said valve system is configured such that at least one vessel is always regenerated, while the other vessels dry the compressed gas.

17. The compressor installation according to claim 1, wherein an aftercooler is included in the outlet pipe.

18. The compressor installation according to claim 17, wherein said aftercooler forms a secondary section of a third heat exchanger, a primary section of which is included in the regeneration pipe.

19. The compressor installation according to claim 18, wherein a primary section of said first heat exchanger and the primary section of the third heat exchanger are combined to form a whole.

20. A method for supplying compressed gas coming from a compressor device with at least one compressor element with a compressed gas outlet connected to a compressed gas outlet pipe, wherein the compressed gas from the compressed gas outlet and the compressed gas outlet pipe is guided through a desiccant for drying said compressed gas and whereby the desiccant is subsequently regenerated in a regeneration section by means of a regeneration gas that is guided through said regeneration section, and wherein the method further comprises steps of:

heating the regeneration gas in a primary section of a heat exchanger before guiding it through said regeneration section, and supplying heat to a secondary section of the heat exchanger through a heat-transfer circuit that is separate from and unconnected to the compressed gas outlet and the compressed gas outlet pipe, said heat-transfer circuit having a first end which is in heat-transferring contact with a heat source in the form of a hotspot in said compressor device where the temperature is higher than the temperature at said outlet of said compressor element, and a second end which is in heat-transferring contact with the secondary section of said heat exchanger.

* * * * *